US012509909B2

(12) United States Patent
Hung

(10) Patent No.: US 12,509,909 B2
(45) Date of Patent: Dec. 30, 2025

(54) MOUNTING PLATE STRUCTURE OF A LOCK

(71) Applicant: TAIWAN FU HSING INDUSTRIAL CO., LTD., Kaohsiung (TW)

(72) Inventor: Chen-Che Hung, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 77 days.

(21) Appl. No.: 18/327,245

(22) Filed: Jun. 1, 2023

(65) Prior Publication Data

US 2024/0318460 A1 Sep. 26, 2024

(30) Foreign Application Priority Data

Mar. 22, 2023 (TW) ................................ 112202594

(51) Int. Cl.
*E05B 3/06* (2006.01)
*E05B 9/00* (2006.01)

(52) U.S. Cl.
CPC ................ *E05B 3/06* (2013.01); *E05B 3/065* (2013.01); *E05B 9/002* (2013.01)

(58) Field of Classification Search
CPC ... E05B 3/00; E05B 3/06; E05B 3/065; E05B 9/002; E05B 2009/004; E05B 2009/006
See application file for complete search history.

(56) References Cited

U.S. PATENT DOCUMENTS

| | | | | |
|---|---|---|---|---|
| 5,666,833 | A * | 9/1997 | Gao | E05B 3/065 292/336.3 |
| 6,745,602 | B2 * | 6/2004 | Nakasone | E05B 3/003 292/357 |
| 8,746,760 | B2 * | 6/2014 | Chen | E05B 3/065 292/357 |
| 10,012,008 | B2 * | 7/2018 | Karnutsch | E05B 3/06 |
| 10,132,103 | B2 * | 11/2018 | Karnutsch | E05B 3/06 |
| 10,508,468 | B2 * | 12/2019 | Murphy | E05B 3/04 |
| 11,920,375 | B2 * | 3/2024 | Mohammed | E05B 3/065 |
| 2006/0156770 | A1 * | 7/2006 | Huang | E05B 3/065 70/224 |

* cited by examiner

*Primary Examiner* — Christopher J Boswell
(74) *Attorney, Agent, or Firm* — Rosenberg, Klein & Lee

(57) ABSTRACT

A mounting plate of a lock includes a coupling portion through which a hole is defined. A limit groove is formed radially in the coupling portion and communicates with the hole. The coupling portion has a notch defined in one of the two sidewalls thereof. The coupling portion has a recess located adjacent to and corresponding to the notch. An abutting portion is formed at the coupling portion and defines the recess. The abutting portion is located corresponding to the notch. When the lock is locked, the brake elements are inserted into the limit groove and partially covers up the notch via the abutting portion so that the brake element is not engaged with the notch. When the lock is unlocked, the brake element is removed from the limit groove and does not engage with the notch to prevent failure of the operation of the lock.

10 Claims, 6 Drawing Sheets

MOUNTING PLATE STRUCTURE OF A LOCK

BACKGROUND OF THE INVENTION

1. Fields of the Invention

The present invention relates to a lock, and more particularly, to a mounting plate of a lock that includes a recess defined in the limit groove so as to form an abutting portion to increase contact area to prevent the brake pad from being stuck in the notch to cause lock failure.

2. Descriptions of Related Art

Locks are commonly installed on objects used for opening and closing, in order to achieve theft prevention and control effects through the locking mechanism. As for the configuration of locks, most of them are installed on the inner side of objects, such as doors, with a turn-button for controlling the locking mechanism. When the lock is locked, the outer door handle is prevented from rotating, and when the turn-button is turned to unlock the lock from the inside, the outer door handle is free to rotate.

Regarding the aforementioned lock configuration, it is typically achieved by setting up a mounting plate with a slot opening in the mounting plate and two positioning slots arranged radially in the mounting plate. A spring is installed on one side of the slot, and a braking plate with two corresponding limit elements to the positioning slots is configured on one end of the spring. The braking plate is connected to an outer door handle, and formed with a locking slot and a limit recess. The depth of the locking slot on the braking plate is less than that of the limit recess. A turn-button of the lock is used to drive a drive rod, which has a corresponding abutting element to the locking slot and limit recess radially arranged thereon. When the drive rod rotates to a certain angle, the abutting element will reach the locking slot, allowing the braking plate to extend into the slot and causing the limit elements to fall into the positioning slots. Since the mounting plate is fixed on the door and cannot rotate, the outer door handle cannot rotate the braking plate to unlock the lock at this time. It is necessary to wait until the drive rod rotates to another angle, causing the abutting element to reach the deeper limit recess. At this time, the braking plate is axially pushed by the spring to detach from the slot, and the limit elements are away from the positioning slots. At this point, the outer door handle can be rotated to drive the braking plate to unlock the lock.

As shown in FIG. 1, the mounting plate 10, as commonly known, is usually made by stamping. In order to form the positioning slots 101, two corresponding openings are usually pre-opened at the side of the mounting plate 10, so that the positioning slots 101 can be formed after stamping. A relatively large gap 102 is formed on both sides of each positioning slot 101 due to the opening. However, when the lock is locked, the limiting elements of the brake pad are positioned in the positioning slots 101, and the contour of the limiting elements corresponds to the positioning slots 101. Therefore, it is often stuck in the gap 102, causing the spring to not smoothly push the brake pad axially, and the outer handle cannot correspondingly drive the brake pad to unlock the lock, resulting in the lock often failing. Although the mounting plate 10 can be manufactured by die-casting to avoid the aforementioned opening or gap 102, the manufacturing cost will be greatly increased, and the manufacturing time will also be longer, which is not conducive to mass production.

In addition, the conventional lock will also have a driving plate attached to the mounting plate, mainly used for axial positioning at the end of the outer door handle, and can rotate in the mounting plate in the direction of the pivot. The driving plate and the mounting plate are configured with a torsion spring in the direction of the pivot, so that after the outer door handle is rotated, it can be reset by the transmission of the torsion spring and the driving plate. However, as for the configuration between the torsion spring and the driving plate, it does not have a positional relationship in the axial direction, and during installation, it is usually necessary to first connect the torsion spring to the driving plate before directly installing the driving plate axially on the outer door handle. However, as mentioned above, since there is no positioning between the torsion spring and the driving plate, it is difficult to install the driving plate firmly on the outer door handle due to the torsion spring falling off or misalignment during the process, which will also cause difficulties for the assembly personnel during assembly and affect the efficiency of the assembly and manufacturing process.

The present invention intends to provide a mounting plate of a lock to eliminate the shortcomings mentioned above.

SUMMARY OF THE INVENTION

The present invention relates to a mounting plate structure of a lock and comprises a mounting plate having a coupling portion, and a hole is defined through the coupling portion. At least one limit groove is formed radially in the coupling portion and communicates with the hole. The coupling portion has a notch defined in one of the two sidewalls. The coupling portion has a recess located adjacent to and corresponding to the notch. An abutting portion is formed at the coupling portion and defines the recess. The abutting portion is located corresponding to the notch.

Preferably, the at least one limit groove is formed by stamping the mounting plate to create the at least one limit groove.

Preferably, the recess and the abutting portion are formed by stamping the coupling portion at a position corresponding to the at least one limit groove.

Preferably, the abutting portion extends along in the axial direction of the coupling portion and at least partially covers the notch.

Preferably, the mounting plate comprises at least one lug. A driving element is disposed one side of the mounting plate with the at least one limit groove. The driving element includes an elastic part, and the elastic part is elastically abutted between the driving element and the at least one lug.

at the at least one limit groove in the mounting plate and includes an elastic part. The elastic part is elastically abutted between the driving element and the at least one lug.

Preferably, the driving element has at least one tab protruded radially inward therefrom to axially secure the elastic element.

Preferably, the at least one tab of the driving element is formed by radial stamping on an outer edge of the driving element.

Preferably, the elastic part is a torsion spring.

The present invention also provides a mounting plate structure of a handle of a lock, and comprises a mounting plate having a coupling portion. A hole is defined through the coupling portion. At least one limit groove is formed radially in the coupling portion and communicates with the hole. The coupling portion has a notch defined in one of the two sidewalls. The coupling portion has a recess located adjacent to and corresponding to the notch. An abutting portion is formed at the coupling portion and defines the recess. The abutting portion is located corresponding to the notch. The mounting plate comprises at least one lug. A driving element is disposed at one side of the mounting plate with the at least one limit groove. The driving element includes an elastic part. The elastic part elastically abuts between the driving element and the at least one lug. A handle has a pivot portion formed to one end thereof, and the pivot portion is pivotally connected to a rose and connected to the driving element. An elastic element is located in the pivot portion of the handle. The mounting plate is engaged with the rose. A transmission assembly extends through the mounting plate and includes a brake pad and a drive rod located corresponding to the hole. The elastic element axially contacts against the brake pad through the hole. The brake pad has a brake element located corresponding to the at least one limit groove. The pivot portion is connected to the brake element in a rotational direction thereof. The brake has at least one first dent and at least one second dent located opposite to the elastic element. The drive rod has an engagement portion that is located corresponding to the at least one first dent and the at least one second dent. When the lock is in a locked status, the drive rod is rotated to engage the engagement portion with the at least one first dent, thereby pushing the brake pad to insert the brake element into the at least one limit groove, and partially located corresponding to the abutting portion. When the lock is in an unlocked status, the drive rod is rotated to engage the engagement portion with the at least one second dent. The elastic element pushes the brake pad and the brake element is removed from the at least one limit groove.

Preferably, the pivot portion comprises at least one protrusion which is located opposite to the handle. The driving element includes a passage that is axially defined through the driving element and located at a non-central position of the driving element. The at least one protrusion is connected to the passage.

The present invention includes the following advantages which are that the present invention enhances stability and effectiveness during operation by using the placement of the abutting portion to partially cover the notch, thereby increasing the contact area with the brake element. This effectively prevents the brake element from getting stuck in the notch when it is inserted into the limit groove, allowing brake element to smoothly disengage from the limit groove in an unlocked status without being hindered by the notch, thereby avoiding lock failure.

The formation of recess and the abutting portion of the present invention is achieved by stamping and forming on the side edge of the coupling portion of the mounting palate. This allows the mounting plate to be manufactured by stamping method and conveniently form the recess and the abutting portion accordingly, significantly reducing the manufacturing cost and time cost of the mounting plate, thereby improving the efficiency of the mounting plate manufacturing.

The inner edge of the driving element of the present invention is radially protruded with a tab, which corresponds to the axial bearing positioning elastic part, allowing the elastic part to be pre-positioned and connected to the driving element when installing the driving element on the pivot portion of the handle. This ensures that the driving element can be directly matched with the pivot portion without causing the elastic part to fall off or shift during assembly, thereby improving the success rate of assembly and enhancing efficiency during installation. Additionally, the tab can also be formed by stamping and indentation on the outer edge of the driving element, thereby enhancing the manufacturing efficiency of the driving element.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
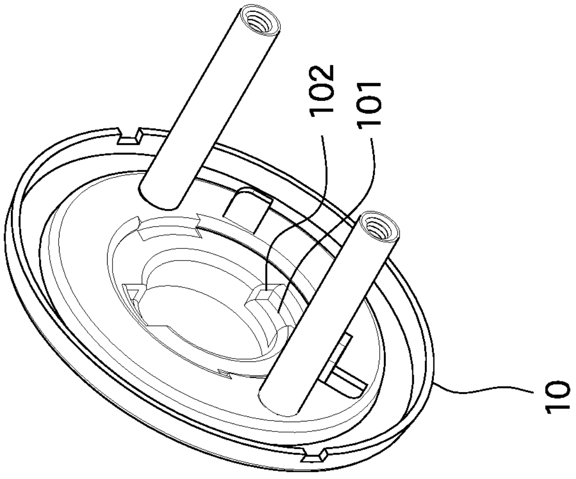
FIG.1(PRIOR ART)
FIG. 1 is a perspective view to show the conventional mounting plate of a lock.
Figure 2:
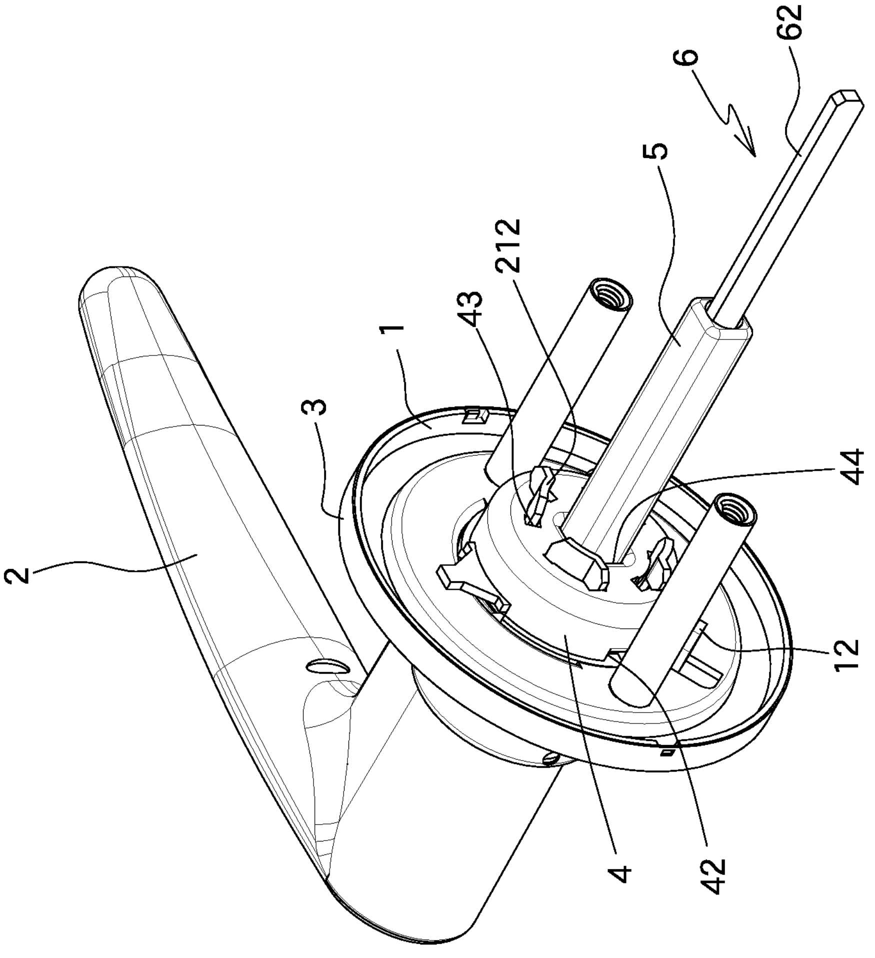
FIG. 2 is a prospective view to show the lock with the mounting plate of the present invention.
Figure 3:
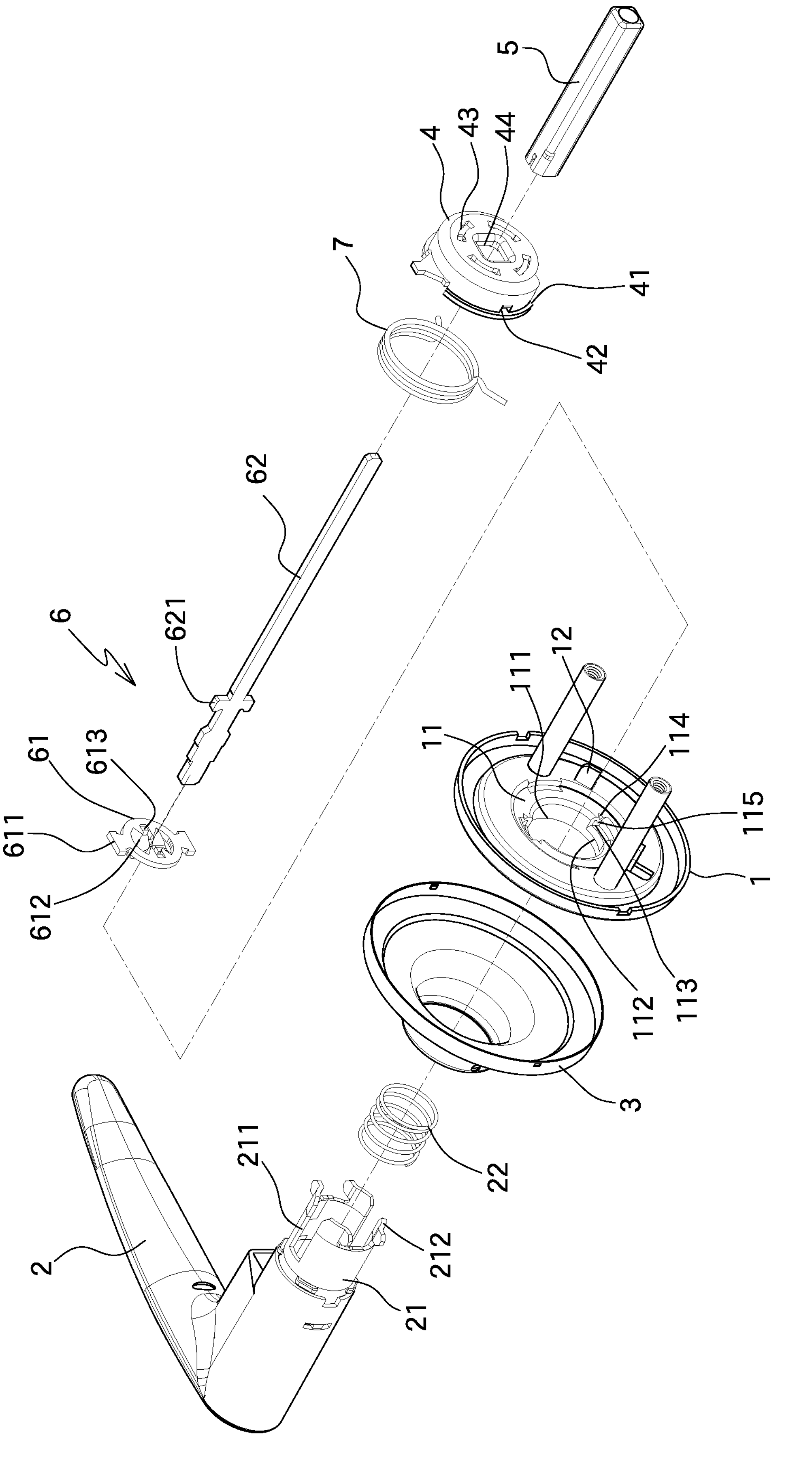
FIG. 3 is an exploded view of the lock with the mounting plate of the present invention.
Figure 4:
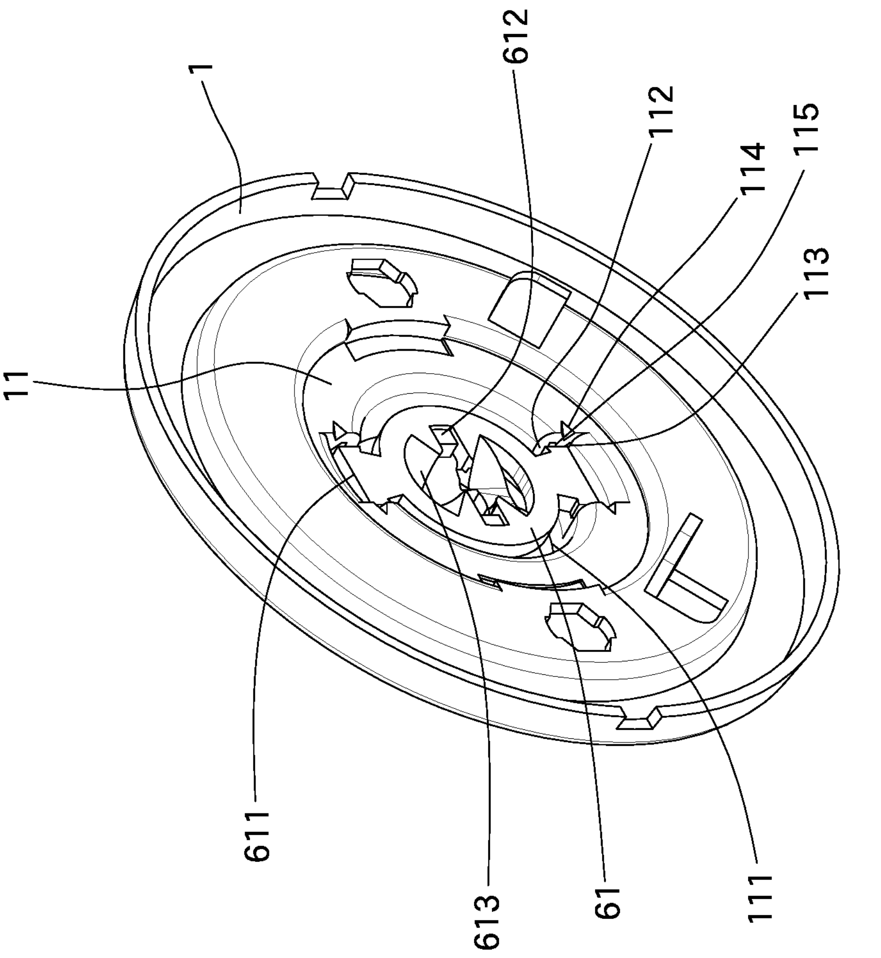
FIG. 4 shows that the brake element is engaged with the limit groove when the lock is locked.

Referring to FIGS. 2 to 4, the mounting plate structure of a lock of the present invention comprises a mounting plate 1 having a coupling portion 11 defined therein. A hole 111 is defined through the coupling portion 11. At least one limit groove 112 is formed radially in the coupling portion 11 and communicates with the hole 111. The coupling portion 11 has a notch 113 defined in one of the two sidewalls of the at least one limit groove 112. The coupling portion 11 has a recess 114 located adjacent to and corresponding to the notch 113. An abutting portion 115 is formed at coupling portion 11 and defines the recess 114. The abutting portion 115 is located corresponding to the notch 113. The coupling portion 11, the hole 111 and the at least one limit groove 112 are formed by stamping the mounting plate 1. The notch 113 is formed when forming the at least one limit groove 112. The recess 114 and the abutting portion 115 are formed by stamping the coupling portion 11 at a position corresponding to the at least one limit groove 112. The abutting portion 115 is formed to the sidewall of the recess 114 and located corresponding to the notch 113 and at least partially covers the notch 113. Preferably, the abutting portion 115 extends in the axial direction of the coupling portion 11 to at least partially cover the notch 113. The abutting portion 115 is aligned with the two sides of the axial projection of the at least one limit groove 112. The abutting portion 115 may also protrudes slightly into the at least one limit groove 112 to cover the notch 113.

As shown in FIGS. 2 to 4, the lock includes a handle 2 which is installed to outside of a door and has a pivot portion 21 at one end thereof. The pivot portion 21 is pivotally connected to a rose 3 and connected to the driving element 4. The driving element 4 drives a tube 5 which is connected to a lock part (not shown). When rotating the handle 2, the pivot portion 21 drives the driving element 4 which then rotates the tube 5 to unlock the lock part. The mounting plate 1 is engaged with the rose 3. An elastic element 22 is located in the pivot portion 21 of the handle 2. A transmission assembly 6 extends through the mounting plate 1 and includes a brake pad 61 and a drive rod 62 located corresponding to the hole 111. The elastic element 22 axially contacts against the brake pad 61 via the hole 111. The brake pad 61 has a brake element 611 located corresponding to the at least one limit groove 112. The pivot portion 21 is connected to the brake element 611 in a rotational direction thereof. In one embodiment, the pivot portion 21 includes a slot 211 which is located corresponding to the brake element 611 so as to locate the brake pad 61 in the pivot portion 21. The brake pad 61 has at least one first dent 612 and at least one second dent 613 located opposite to the elastic element 22. The drive rod 62 has an engagement portion 621 that is located corresponding to the at least one first dent 612 and the at least one second dent 613.

The two sidewalls of the at least one limit groove 112 are spaced apart along the rotational direction.

Figure 5:
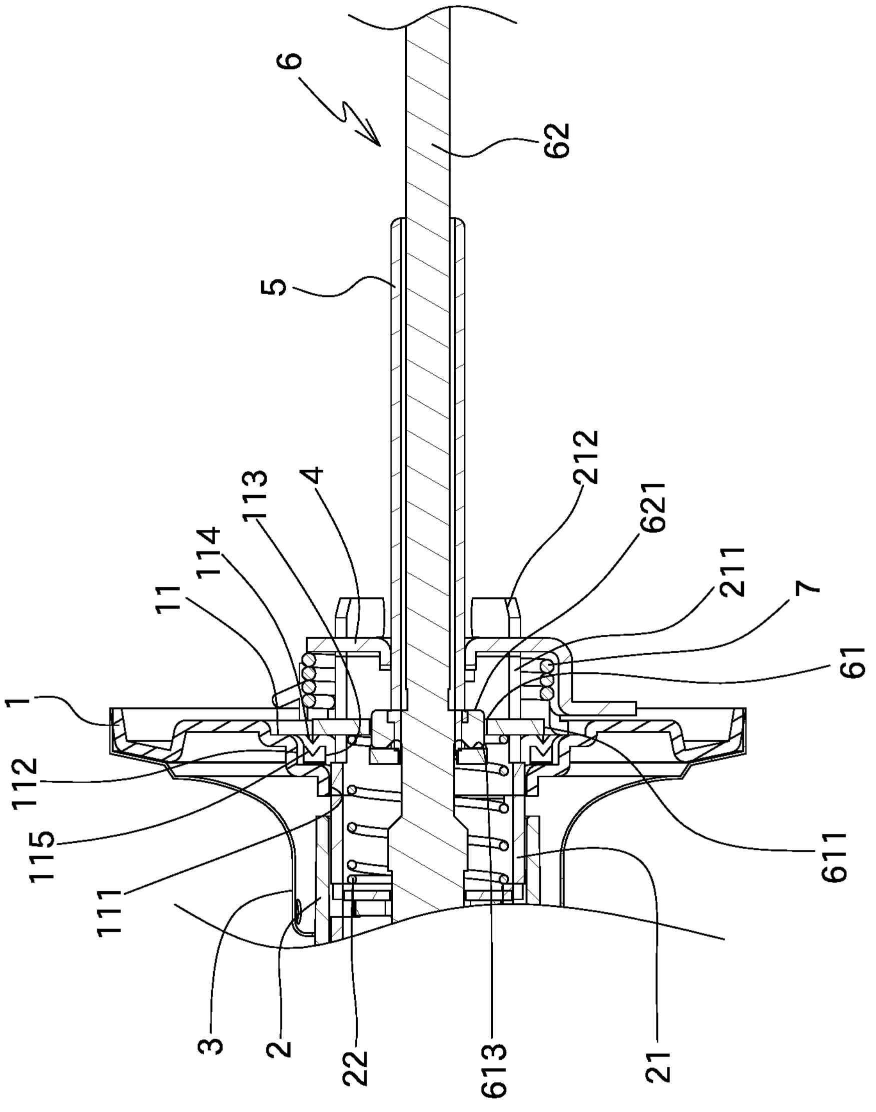
FIG. 5 is a cross sectional view to show that the lock with the mounting plate of the present invention is unlock.

As shown in FIGS. 3 and 5, when in a locked status, the drive rod 62 is secured in the axial direction and connected to a turn-button or a push-button (not shown) on the inside of the door. When the turn-button is rotated to a locked status, the drive rod 62 is rotated to engage the engagement portion 621 with the at least one first dent 612. It is noted that the depth of the at least one second dent 613 is deeper than that of the at least one first dent 612, so that the engagement portion 621 pushes the inner wall of the at least one first dent 612 to move the brake pad 61 to compress the elastic element 22, such that the brake pad 61 is inserted into the hole 111 as shown in FIG. 5. The brake element 611 of the brake pad 61 is inserted into the at least one limit groove 112. Therefore, the brake pad 61 cannot rotate due to the at least one limit groove 611. The handle 2 is connected to the brake element 611 via the pivot portion 21 so that the handle 2 cannot be rotated and the lock is locked. As shown in FIGS. 4 and 5, the abutting portion 115 is located corresponding to the notch 113 of the at least one limit groove 112, and the brake element 611 is partially located corresponding to the abutting portion 115, so that one side of the brake element 611 in the rotational direction thereof cannot be inserted into the or engaged with the notch 113 because of the abutting portion 115. This specific arrangement prevents the brake element 611 from being engaged with the notch 113 and from being returned by the elastic element 22 when the lock is unlocked. Therefore, when the lock is in a unlocked status, the drive rod 62 is rotated to engage the engagement portion 621 with the at least one second dent 613, as shown in FIG. 4, the elastic element 22 axially pushes the brake pad 61 and the brake element 611 is removed from the at least one limit groove 112. The brake pad 61 is not restricted by the mounting plate 1, and is rotatable by the handle 2 and the pivot portion 21.

Figure 6:
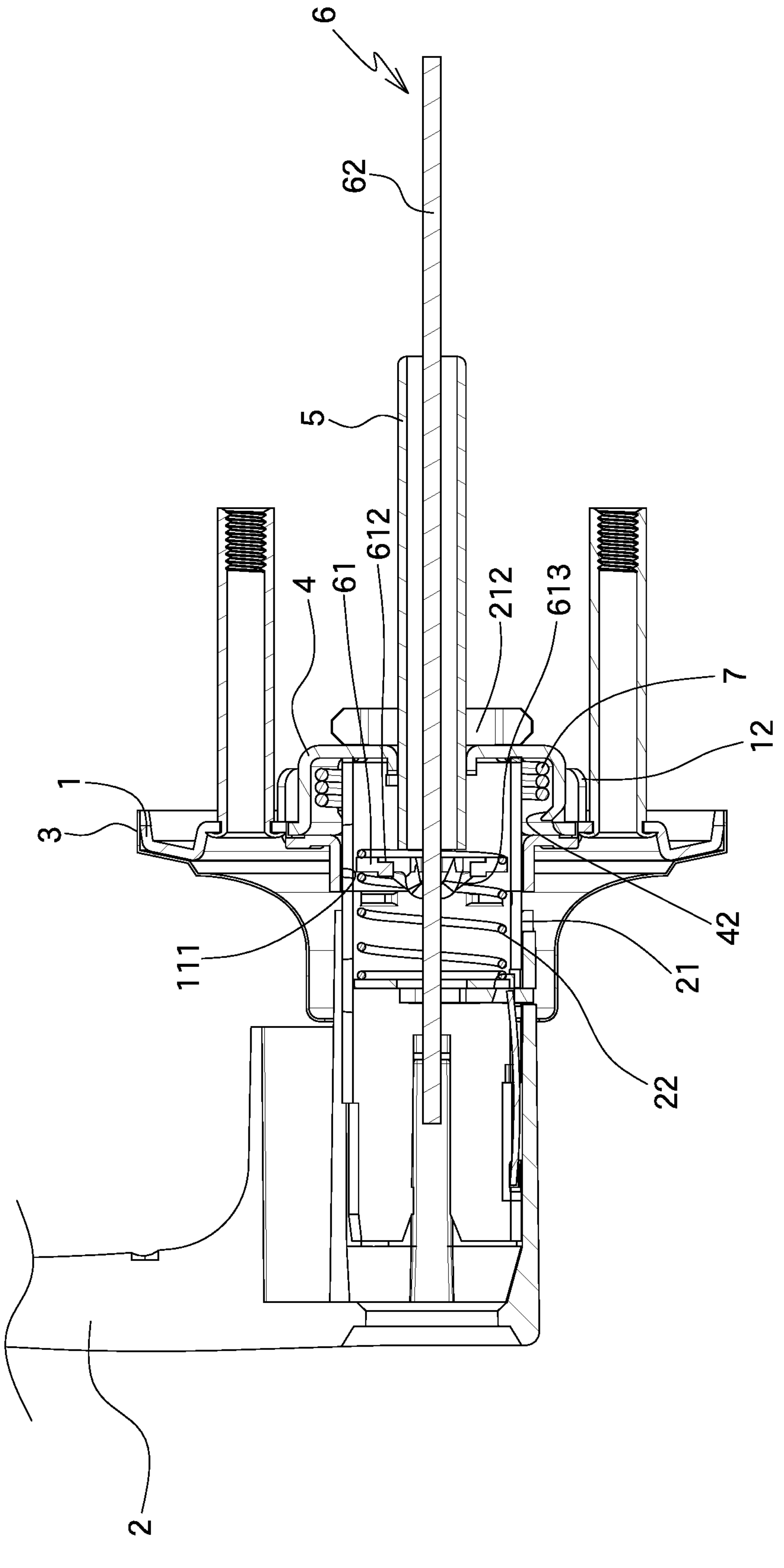
FIG. 6 is a cross sectional view of the lock with the mounting plate of the present invention to show the tab of the driving element.

As shown in FIGS. 2, 3 and 6, the driving element 4 is engaged with one side of the mounting plate 1 with the at least one limit groove 112. The mounting plate 1 comprises at least one lug 12, and the driving element 4 includes an elastic part 7 disposed between the coupling portion 11 and the driving element 4. The elastic part 7 is a torsion spring in this embodiment. The elastic part 7 is elastically abutted between the driving element 4 and the at least one lug 12. In one embodiment, the driving element 4 includes a cut-off 41 formed in a periphery thereof so that one leg of the elastic part 7 contacts against an inside of the cut-off 41. When the handle 2 is rotated to rotate the driving element 4, the two legs of the elastic part 7 respectively contact the cut-off 41 and the at least one lug 12 so that when the user's hand releases the handle 2, the elastic part 7 elastically returns the handle 2 via the driving element 4. Preferably, the driving element 4 has at least one tab 42 protruded radially inward therefrom to axially secure the elastic part 7, so that the elastic part 7 and the driving element 4 form a combination which is benefit for assembly of the pivot portion 21 and for correctly positioning the elastic part 7. Therefore, during assembly, the elastic part 7 does not shift or drop off to enhance the efficiency of assembly.

In one embodiment, the at least one tab 42 of the driving element 4 is formed by radial stamping on an outer edge of the driving element 4, so that the manufacturing of the driving element 4 with the at least one tab 42 is easy and convenient.

In one embodiment, the pivot portion 21 comprises at least one protrusion 212 which is located opposite to the handle 2. The driving element 4 includes a passage 43 that is axially defined through the driving element 4 and located at a non-central position of the driving element 4. The at least one protrusion 212 is connected to the passage 43. Therefore, the pivot portion 21 is able to rotate the driving element 4 via the at least one protrusion 212, and the tube 5 is driven to unlock the lock. The driving element 4 has a non-circular bore 44 at the center thereof and the tube 5 is engaged with the non-circular bore 44, such that the tube 5 is driven to unlock the lock.

While we have shown and described the embodiment in accordance with the present invention, it should be clear to those skilled in the art that further embodiments may be made without departing from the scope of the present invention.

What is claimed is:

1. A mounting plate structure of a lock comprising:

a mounting plate having a coupling portion, a hole defined through the coupling portion, at least one limit groove formed radially in the coupling portion and communicating with the hole, the coupling portion having a notch, the notch being a gap formed in one of two sidewalls of the coupling portion, the notch formed adjacent to the at least one limit groove, the coupling portion having a recess located adjacent to and corresponding to the notch, and an abutting portion formed at the coupling portion with the recess defining the abutting portion, the abutting portion located corresponding to and impinging the notch.

2. The mounting plate structure of a lock as claimed in claim 1, wherein the at least one limit groove is formed by stamping the mounting plate to create the at least one limit groove.

3. The mounting plate structure of a lock as claimed in claim 1, wherein the recess and the abutting portion are formed by stamping the coupling portion at a position corresponding to the at least one limit groove.

4. The mounting plate structure of a lock as claimed in claim 1, wherein the abutting portion extends along in the axial direction of the coupling portion and at least partially covers the notch.

5. The mounting plate structure of a lock as claimed in claim 1, wherein the mounting plate comprises at least one lug, a driving element is disposed at one side of the mounting plate with the at least one limit groove, the driving element includes an elastic part, the elastic part is elastically abutted between the driving element and the at least one lug.

6. The mounting plate structure of a lock as claimed in claim 5, wherein the driving element has at least one tab protruded radially inward therefrom to axially secure the elastic part.

7. The mounting plate structure of a lock as claimed in claim 6, wherein the at least one tab of the driving element is formed by radial stamping on an outer edge of the driving element.

8. The mounting plate structure of a lock as claimed in claim 5, wherein the elastic part is a torsion spring.

9. A mounting plate structure of a handle of a lock, comprising:

a mounting plate having a coupling portion, a hole defined through the coupling portion, at least one limit groove formed radially in the coupling portion and communicating with the hole, the coupling portion having a notch, the notch being a gap formed in one of two sidewalls of the coupling portion, the notch formed adjacent to the at least one limit groove, the coupling portion having a recess located adjacent to and corresponding to the notch, an abutting portion formed at the coupling portion with the recess defining the abutting portion, the abutting portion located corresponding to and impinging the notch, the mounting plate comprising at least one lug, a driving element disposed at one side of the mounting plate with the at least one limit groove, the driving element including an elastic part, the elastic part elastically abutted between the driving element and the at least one lug, and a handle having a pivot portion at one end thereof, the pivot portion pivotally connected to a rose and connected to the driving element, an elastic element located in the pivot portion of the handle, the mounting plate engaged with the rose, a transmission assembly extending through the mounting plate and including a brake pad and a drive rod located corresponding to the hole, the elastic element axially contacting against the brake pad through the hole, the brake pad having a brake element located corresponding to the at least one limit groove, the pivot portion connected to the brake element in a rotational direction thereof, the brake pad having at least one first dent and at least one second dent located opposite to the elastic element, the drive rod having an engagement portion that is located corresponding to the at least one first dent and the at least one second dent, when the lock is in a locked status, the drive rod is rotated to engage the engagement portion with the at least one first dent, thereby pushing the brake pad to insert the brake element into the at least one limit groove and partially located corresponding to the abutting portion, when the lock is in an unlocked status, the drive rod is rotated to engage the engagement portion with the at least one second dent, the elastic element pushes the brake pad and the brake element is removed from the at least one limit groove.

10. The mounting plate of a handle of a lock as claimed in claim 9, wherein the pivot portion comprises at least one protrusion which is located opposite to the handle, the driving element includes a passage that is axially defined through the driving element and located at a non-central position of the driving element, the at least one protrusion is connected to the passage.

* * * * *